Oct. 1, 1929.　　　P. THOMAS　　　1,730,254
CONTROL SYSTEM
Filed May 3, 1928

INVENTOR
Phillips Thomas
BY
ATTORNEY

Patented Oct. 1, 1929

1,730,254

UNITED STATES PATENT OFFICE

PHILLIPS THOMAS, OF EDGEWOOD, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed May 3, 1928. Serial No. 274,762.

This invention pertains to electrical control systems and has for its principal object the provision of a control system which shall be capable of controlling considerable amounts of alternating-current energy in accordance with variations in a small direct current.

A further object of my invention is to provide an electrical system of control of the type described which is adaptable for manual or automatic operation.

A further object of this invention is to provide a control system characterized by simplicity and cheapness of construction and reliability in operation.

In accordance with my invention I employ a plurality of saturable iron-core reactors of the type described in my copending application, Serial No. 221,490, filed September 23, 1927 for Synchronizing relay systems. These reactors are provided with alternating-current windings similar to those of the usual core-type distribution transformer and, in addition, with a direct-current winding the function of which is to saturate the reactor core and thereby reduce the net alternating flux in the core so that the voltage induced in the alternating-current winding is correspondingly reduced and the effective reactance of the reactor itself is likewise reduced.

The operation of the reactors above described follows from the well known principle that the superposition of a uni-directional flux upon an alternating flux in a magnetic circuit has the effect of reducing the net alternating flux in the magnetic circuit.

Further objects of my invention will become apparent in the course of the following description thereof and the features which I consider novel will be particularly pointed out in the appended claims.

Figure 1:
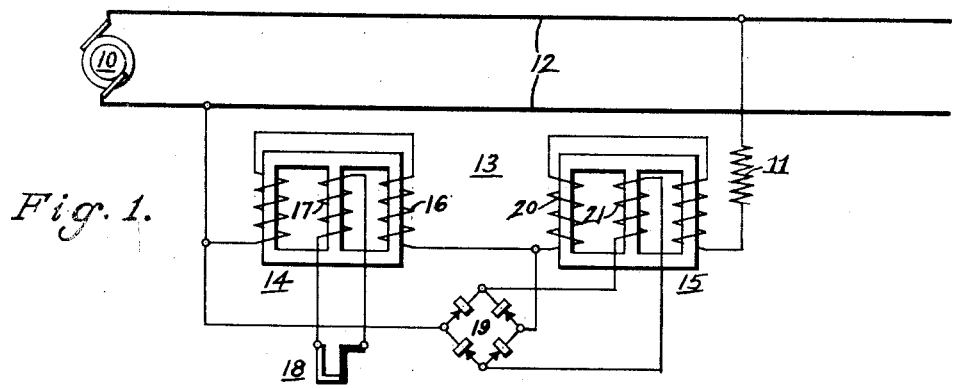
Figure 2:
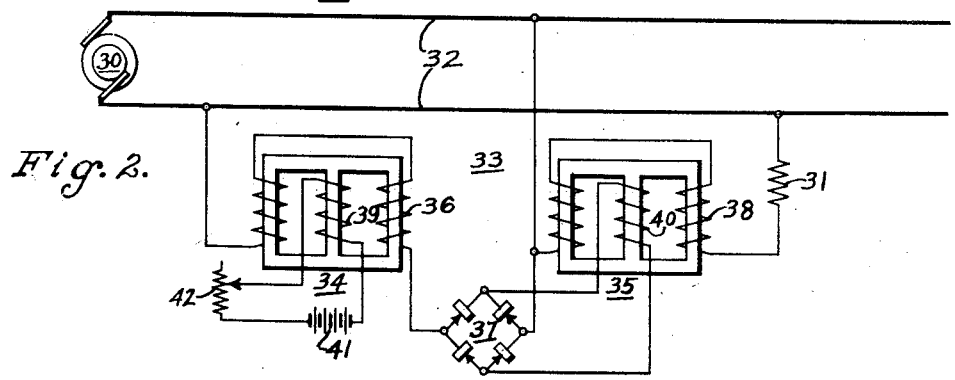
Figure 3:
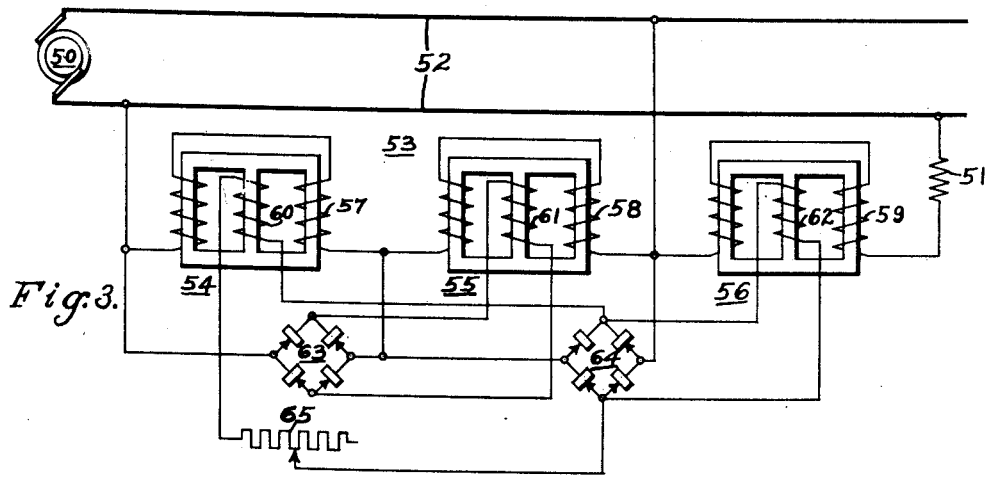

A complete understanding of my invention may be obtained from a consideration of the accompanying drawings, in which Figs. 1, 2 and 3 illustrate, schematically, various modifications of the control system of my invention.

Referring particularly to Fig. 1, a source of alternating current 10 is adapted to supply energy to a load device 11 over the distribution circuit 12 and the control system indicated generally at 13.

This control system consists of two of the above-mentioned iron-core reactors 14 and 15. The reactor 14 is provided with an alternating-current winding 16 and a direct-current winding 17. The alternating-current winding 16 is evenly divided between the two outside arms of the magnetic circuit so that the net alternating flux in the center arm is always zero. The direct-current winding 17 may be energized from any suitable control source, as an example of which I have illustrated a thermo-couple 18.

Connected in parallel with the alternating current winding 16 of the reactor 13 is a full wave rectifier 19 which may be of any suitable type but is, preferably, of the copper-oxide-disc type.

The reactor 15, like the reactor 14, is provided with an alternating-current winding 20 and a direct-current winding 21. The alternating-current winding 20 and the load device 11 are connected in series, and in series with the reactor 14 and the rectifier 19 in parallel, across the distribution circuit 12.

Although the load device 11 may be of any type whatever, my invention is particularly suited for the control of such load devices as electric furnaces or other heating devices, and, according to one modification of my invention, it is possible to maintain automatically a constant temperature at any desired point.

The method of operation of the system shown in Fig. 1 will now be described.

As is apparent from Fig. 1, the alternating-current windings 16 and 20 of reactors 14 and 15 are connected in series across distribution circuit 12, the load device 11 being connected in series with the reactors 14 and 15. When the direct-current windings 17 and 21 of the reactors 14 and 15 are de-energized the reactance of the alternating-current windings 16 and 20 of the reactors 14 and 15 attains its maximum value and the voltage across the circuit 12 is divided between the reactors 14 and 15 and the load device 11.

Obviously, the same voltage that exists across the alternating-current winding 16 of the reactor 14 appears across the alternating-current terminals of the rectifier 19 and a direct current, proportional thereto, flows from the remaining terminals of the rectifier to the direct-current winding 21 of the reactor 15.

As long as the winding 21 is de-energized, as a result of an open circuit, for example, the voltage across the alternating-current winding 20 of the reactor 15 is large compared to that across the terminals of the load device 11 which is, therefore, energized only to a slight degree.

The energization of the direct-current winding 21 of the reactor 15, however, saturates the core of the reactor and, in accordance with the foregoing explanation, reduces the net alternating flux in the reactor core, and, consequently, reduces the voltage across the alternating-current winding 20 and increases the voltage across the load device 11 in series therewith. The energization of the load device 11 is, of course, increased in proportion to the increase in the voltage thereacross.

If it be now assumed that the temperature of the thermo-couple 18 is increased, the direct-current winding 17 of the reactor 14 will be correspondingly energized. The voltage across the alternating-current winding 16 will thereupon be reduced and likewise the voltage across the rectifier 19 so that, as a result of the increase in the temperature of the thermo-couple 18, a decrease in the energization of the winding 21 of the reactor 15 occurs. As already explained, the reduction in the energization of the winding 21 causes an increase in the voltage induced in the winding 20, and a decrease in the voltage impressed upon the load device 11.

It is thus apparent that variations in the temperature of the thermo-couple 18 will be effective to cause corresponding changes in the energization of the device 11.

The reactor 15 should be designed so that its impedance will be high when unsaturated and low when saturated, as compared with the impedance of the load device 11. This relation between the load impedance and the variable controlling impedance makes possible a continuous control of the former over a wide range.

Referring now to Fig. 2, which is a diagram illustrating a modification of my invention, the alternating-current source 30 is adapted to supply a load device 31 over the distribution circuit 32 and the control system 33.

The control system 33 comprises a plurality of reactors 34 and 35. The alternating-current winding 36 of the reactor 34 is connected across the circuit 32 in series with the rectifier 37 while the alternating-current winding 38 of the reactor 35 is connected across the circuit 32 in series with the load device 31.

The reactors 34 and 35 are provided with direct-current windings 39 and 40. The winding 39 is connected to any suitable source of energy such as a battery 41, in series with a control device such as the rheostat 42. The direct-current winding 40 of the reactor 35 is connected to the direct-current terminals of the rectifier 37. The operation of the system illustrated in Fig. 2 is similar to that shown in Fig. 1 except that the reactor 35 controls the current through the load device 31 while the reactor 15 controls the voltage across the load device 11. An increase in the energization of the winding 39 of the reactor 34 saturates the core thereof and reduces the voltage across the winding 36. An increased voltage is thus impressed upon the alternating-current terminals of the rectifier 37 so that the energization of the direct-current winding 40 of the reactor 35 is increased. This results in a corresponding decrease in the voltage across the winding 38 of the reactor 35 and an increase in the voltage across the load device 31 or, in other words, an increase in the current therethrough.

Conversely, a decrease in the energization of the winding 39 will cause the voltage induced in the winding 36 to increase so that a smaller portion of the line voltage is effective across the rectifier 37. A reduced current thereby energizes the winding 40 of the reactor 35 so that the voltage across the alternating-current winding 38 thereof is increased and the voltage drop across the load device 31 is correspondingly decreased.

It will be obvious that, if the impedance 42 is the exploring coil of a resistance thermometer, the energization of the device 31 may be automatically controlled in accordance with the temperature at any given point.

If the device 31 is an electric furnace or other heating apparatus, and if the exploring coil 42 is placed in close proximity thereto, the following operation will result: An increase in the temperature of the device 31 will likewise increase the resistance of the exploring coil 42 and decrease the energization of the winding 39. As already explained, this decrease in the energization of the winding 39 causes an increase in the voltage across the winding 36 and a decrease in the voltage across the rectifier 37 with a consequent decrease in the energization of the winding 40. This last variation causes the voltage across the winding 38 to increase and that across the device 31 to decrease so that its energization is decreased and its temperature reduced.

Should the temperature of the heating device 31 be reduced beyond a predetermined value, the energization of the winding 39 would be increased as a result of the decrease in the resistance of the coil 42. Thus the voltage across the winding 36 will be decreased and that across the rectifier increased causing an increase in the energization of the winding 40 and a decrease in the voltage across the winding 38 followed by a corresponding increase in the voltage on the device 31. The temperature of the device 31 is, therefore, increased to the afore-mentioned predetermined value.

The constant temperature maintained by the system of my invention, as explained above, obviously depends upon the design of the reactors 34 and 35 and the extent to which the energization of the windings 39 and 40 is varied by the changes in the temperature of the exploring coil 42.

A third modification of my control system is illustrated in Fig. 3 wherein an alternating-current source 50 supplies energy to a load device 51 through a distributing circuit 52 and a control system 53.

The control system 53 comprises three reactors 54, 55 and 56 having alternating-current windings 57, 58 and 59 and the direct current-windings 60, 61 and 62. The windings 57 and 58 are connected in series across the circuit 52 and rectifiers 63 and 64 are connected in parallel with the windings respectively. The winding 59 of the reactor 56 is connected across the circuit 52 in series with the load device 51.

The rectifier 63 supplies direct current to the winding 61 of the reactor 65 while the rectifier 64 energizes the direct-current windings 60 and 62 of the reactors 54 and 56.

A rheostat 65 controls the energization of the winding 60.

The operation of the system shown in Fig. 3 is similar to that of those modifications already described, but in the system of Fig. 3, a slight change in the setting of the rheostat 65 causes a greater change in the energization of the load device 51 than in the systems of Figs. 1 and 2 because of the regenerative or amplifying effect made possible by the use of the third reactor.

An increase in the resistance of the circuit including the winding 60 of the reactor 54, which is energized by the rectifier 64 connected across the winding 58 of the reactor 55, will cause an increase in the voltage across the winding 57 and the rectifier 63. The increased energization of the winding 61, resulting therefrom, decreases the voltage induced in the winding 58 which is impressed upon the rectifier 64. Thus the energization of the winding 60 is still further decreased and the effect introduced by the increase in the resistance in the circuit of the winding 60 is, therefore, magnified. The reduction in the voltage across the rectifier 64 effects a decrease in the energization of the winding 62 of the reactor 66 so that the voltage across the winding 59 is increased and that across the load device 51 is decreased.

A decrease in the resistance of the circuit, including the winding 60, causes the voltage across the winding 57 and the rectifier 63 to be decreased and the energization of the winding 61 is, therefore, correspondingly decreased. The resulting increase in the voltage across the winding 58 and the rectifier 64 further the effect of the increased energization of the winding 60. The winding 62 is also subject to an increased voltage and the voltage across the winding 59 decreases and that across the load device 51 increases.

It is apparent from the foregoing description that I have provided means for varying the division of the voltage across a distribution circuit between a load device and a control impedance. As previously stated, this control may be effected manually or automatically and may be utilized in a wide variety of applications.

Among the particular advantages of the system of my invention is the fact that the control is effected without the use of any moving parts. The reactors and their windings are entirely static and no circuits need be made nor broken to obtain a positive, continuous control of the energization of the load devices.

As an example of the effectiveness of my system, a practical embodiment thereof disclosed results as follows: A variation in the energization of the winding 39 of Fig. 2 from zero to .5 of a watt caused a change in the power supplied to the load device from 200 to 800 watts. Thus a variation of .5 of a watt in the energization of the winding 39 produced a change of 600 watts in the energization of the load device 31. The amplification factor, therefore, was 600/.5 or 1200. These figures show that a large change in the energization of the load device may be effected by comparatively small change in the energization of the direct-current winding of the controlling reactor.

Although I have described but three modifications of the system embodying my invention, and mentioned only one specific application thereof, it is not my intention that the scope of the invention be limited to the modifications herein disclosed except as necessitated by the appended claims.

I claim as my invention:

1. A control system comprising a plurality of iron-core reactors having alternating-current windings and direct-current windings, means for controlling the energization of the direct-current winding of one of said reactors, and means connected to the alternating-current winding of said reactor for energizing the direct-current winding of another of said reactors, and a load device connected to the alternating-current winding of said last-mentioned reactor.

2. An electrical system of control comprising a plurality of iron-core reactors having alternating-current and direct-current windings, means for energizing the direct-current winding of one of said reactors, a rectifier connected to the alternating-current winding of said reactor for energizing the direct-current winding of another of said reactors, and a load device connected to the alternating-current winding of said last-mentioned reactor.

3. A power-amplifying system comprising a plurality of iron-core reactors having direct-current and alternating-current windings, the direct-current winding of one of said reactors being connected to an input circuit, the alternating-current winding of another of said reactors being connected to an output circuit, and means for energizing the direct-current winding of the last-mentioned reactor in accordance with the voltage induced in the alternating-current winding of said first-mentioned reactor, whereby the variations in the power supplied to said input circuit are amplified in said output circuit.

In testimony whereof, I have hereunto subscribed my name this 24th day of April, 1928.

PHILLIPS THOMAS.